May 26, 1970 A. JENSEN 3,514,642

ELECTRICALLY CONTROLLED SWITCH

Original Filed March 8, 1965

United States Patent Office 3,514,642
Patented May 26, 1970

3,514,642
ELECTRICALLY CONTROLLED SWITCH
Arne Jensen, Havnbjerg, Als, Denmark
Continuation of application Ser. No. 437,983, Mar. 8, 1965. This application Oct. 10, 1968, Ser. No. 789,626
Claims priority, application Germany, Mar. 13, 1964, D 43,872
Int. Cl. H03k *17/74*
U.S. Cl. 307—305 6 Claims

ABSTRACT OF THE DISCLOSURE

A switching circuit for use in logic operations and the like having a plurality of serially connected voltage-responsive, bilateral, solid state switching elements of the type changing from a high resistance value to a low resistance value when a predetermined switching threshold voltage is applied thereacross assuming an "on" condition upon application of voltage trigger pulses of the same polarity as the half-waves of a voltage source connected to the circuit without necessity of absolute synchronism of the trigger pulses applied to the various switching elements within the same half-wave voltage from the voltage source. A voltage divider of series impedances applies holding current to the switching elements individually to maintain the "on" condition to avoid necessity of synchronism of the pulses.

This application is a continuation of application Ser. No. 437,983, filed Mar. 8, 1965.

The present invention relates to an electrically controlled solid state switch, and more particularly to a switch using two-terminal solid state elements capable of rapid, controlled switching under control of a trigger impulse.

The elements used in the switch of the present invention utilize solid state switching elements which have the characteristic that they change their resistance from that of a high resistance value, in the order of up to several megohms, to one of low resistance value, in the order of an ohm or even less, when a predetermined switching threshold voltage connected thereacross, is exceeded. The switching threshold voltage is chosen to be greater than that of the line voltage. Thus, with only line voltage applied, the switch will remain in its high value of resistance, or switched OFF condition. A trigger potential such as a pulse, which is greater than the switching threshold voltage and thus greater than the line voltage is applied across the element to change it to its low resistance, conducting condition.

The solid state switch elements remain in their low resistance, ON condition, as long as a certain holding current flows therethrough. When the holding current decreases below a certain value, the element switches again to its high resistance condition. Thus, if the element is connected to a source of alternating current supply and a trigger pulse changes the element to its low resistance condition before the current therethrough is sufficient to reach the holding current value, the element will switch back to its high resistance condition. Another trigger pulse may not be forthcoming for the same half-wave, and thus a switching failure may occur. This may occur particularly when a plurality of such elements are connected in series. Absolute synchronism of the trigger sources for all the solid state switching elements may be necessary in order to provide for positive switching.

If switching is to be done in accordance with a logical function, for example if the entire circuit is to be switched ON only if a number of such elements are placed in their conductive condition, provision must be made to keep such elements as have already been switched ON conductive, even after the trigger pulse for the particular element has terminated.

It is an object of the present invention to provide a circuit which will enable solid state switching elements, which have been switched ON or placed in their low resistance condition, to maintain this low resistance condition even though the remainder of the circuit may not yet be in the same state.

Briefly, in accordance with the present invention, serially connected solid state switching elements which change their resistance from a high value to a low value when a predetermined switching threshold potential applied thereacross is exceeded, and change back to the high value when the current therethrough decreases below a predetermined holding value, are connected in parallel with a group of serially connected impedances, forming a voltage divider. At each point where elements are connected together to form the series chain, a cross connection to a tap off point on the voltage divider is made. The voltage divider is so dimensioned in view of the line voltage, that sufficient current will flow therethrough to provide holding current for any element which has switched to its low resistance condition.

The switching threshold potential is applied as trigger pulses of the same polarity as the polarity of the half-cycle during which they are applied. Thus, for example, positive pulses are applied during the positive half-cycle or positive half-wave of an applied voltage from an AC voltage source; otherwise if the pulses were of opposite polarity than the half-wave during which they are applied they would "buck" the voltage source voltage and thus the threshold potential would not be attained.

A particularly interesting device for use in connection with solid state switch elements useful in the invention is made from tellurium, with additives taken from Groups IV and V of the Periodic Table of Elements. The base substance is polycrystalline. These switches are absolutely symmetrical, have high current carrying capacity, and are easily manufactured. Their switching threshold potential can readily be changed by choice of the relative ratio of components, or by appropriate choice of the thickness of the body. As an example, a solid state switch may consist of approximately 67.5% tellurium, 25% arsenic, and 7.5% germanium or silicon, made by vapor deposition, or evaporation, or sputtering-on, on a metal plate, by sintering, or by solidification of an alloy melt.

An electrode may be applied to the body directly such as by sputtering-on, or evaporating-on the body a conductive layer and then soldering a terminal wire thereto. A capacitatively coupled electrode may be applied by either forming a thin insulating oxide layer on the body of tellurium and its additives, or by applying a thin mica-plate thereon, and securing an electrode against the oxide layer or the mica-plate as the case may be.

The action of the solid state switching elements just described is not entirely understood; it is believed, however, that a thermal breakdown occurs whenever a trigger pulse is applied across the main electrodes, or across a starting electrode. The material has a negative temperature-resistance coefficient. The current due to the trigger pulse causes localized heating, which in turn lowers the resistance of the path, thus increasing the current therethrough and so on until the low resistance state is reached. Once the low resistance state is reached, a very small holding current will suffice to keep the path conductive. This path may be at random within the body itself. When the holding current is removed, the path is destroyed and a new, random current path will be formed when a new trigger potential is applied.

Other devices than the above mentioned polycrystalline elements may be used; for example, silicon controlled rectifiers, or silicon controlled switches, that is multi-layer diodes, may be used. In their commercial form, these multi-layer diodes require the application of a triggering potential and have separate trigger or gate electrodes. The circuits according to the present invention do not require the use of a separate trigger or gate electrode, or a connection thereto. If these devices are used, the trigger or gate electrodes may be left blank or unconnected.

The structure, organization and operation of the invention will now be described more specifically in the following detailed description with reference to the accompanying drawings, in which.

Figure 1:
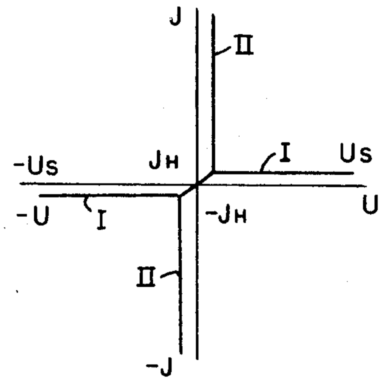
FIG. 1 is a typical voltage abscissa vs. current (ordinate) diagram for a solid state switching element for use in the switch according to the present invention.

FIG. 1 shows, diagrammatically, a current J through a symmetrical solid state switching element, having a voltage U applied thereacross. Below the threshold potential $\pm U_S$, the current is practically zero since the element is in its high resistance state, in which its resistance is up to several megohms (curve I). As soon as the switching threshold potential $U_S$ is exceeded, the switching element changes to its low resistance state (curve II), in which its resistance may be one ohm or less. The current through the switch is then essentially determined only by the resistance of the remainder of the circuit. The element remains in the low resistance state until the current therethrough decreases or drops below the holding value $J_H$, which is almost at the zero point. As soon as $J_H$ is passed, the element changes back to its high resistance state. Five layer diodes or other multi-layer diodes with an odd number of layers show this characteristic. The best results, however, have not been obtained with multi-layer diodes, but with the polycrystalline solid state switching element consisting essentially of tellurium, with the additives previously mentioned.

Figure 2:
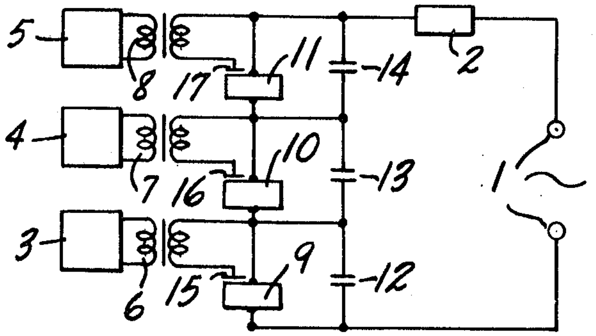
FIG. 2 is a circuit diagram of the switch with separate control sources, suitable for logical switching.

Referring now to FIG. 2: This figure illustrates a source of alternating potential 1, a load in the form of a resistance 2, and serially connected solid state switching elements 9, 10 and 11. When all solid state switch elements 9, 10, 11 are in their low resistance state, current will flow through load 2. In parallel with switching elements 9, 10, 11 is a voltage divider formed of condensers 12, 13, 14. Cross connections are provided between adjacent switch elements of the serially connected chain and adjacent condenser elements. Each one of the solid state switching elements is provided with a trigger or starting electrode 15, 16, 17, which is coupled over transformer 6, 7, 8 to a respective source of trigger potential 3, 4, 5. The voltage applied across any solid state element, from the trigger electrode to the lower electrode and back to the upper electrode (with respect to FIG. 2 in the drawings) of any element is twice that of the switching threshold voltage $U_S$ (FIG. 1).

Let it be assumed that the source of trigger potential 3 provides a short duration peaked pulse shortly after current from source 1 has passed through its zero or null value. The peaked pulse applied from trigger source 3 across transformer 6 to switching element 9 is of the same polarity as the polarity of a half-wave voltage from the source 1 and changes the state of the switching element to its low resistance, conductive condition. This element would, however, switch back to its high resistance state as soon as the peaked pulse from source 3 disappears, unless a current is supplied from the parallel connected voltage divider. Condensers 13, 14 provide current which may be small, but is sufficient to keep element 9 in its low resistance state, since the holding current $J_H$ (FIG. 1) is also small. Thus, solid state element 9 will remain in its low resistance state until approximately the half-wave from source 1 goes again through null. With respect to element 9, it is thus irrelevant at which time within the same half-wave trigger sources 4 and 5 supply their pulses to elements 10 and 11. Of course, load current will flow through load 2 only when all three elements 9, 10 and 11 are switched; complete synchronism between the operation of sources 3, 4, 5 is not necessary, however. If current through load 2 is to flow only upon a logical determination of a pulse from all three sources 3, 4, 5, which pulses may, however, occur at any time within the same half-wave from source 1, the voltage divider will hold such elements as have switched into their low resistance state until the remaining switching element, or elements have also switched to their low resistance state.

Figure 3:
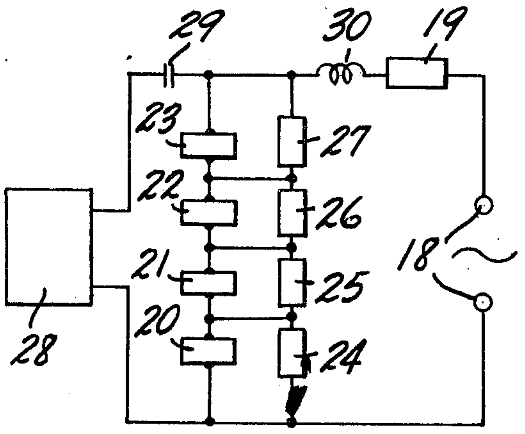
FIG. 3 is a diagram of the switch within a simple control source.

FIG. 3 illustrates a different form of the invention; load resistance 19, connected to a network 18 supplying alternating current, is being switched by the use of four solid state switching elements 20, 21, 22 and 23. Increasing the number of switching elements enables the use of higher line voltage at network 18. In parallel to switching elements 20–23 is a voltage divider formed of resistances 24, 25, 26, 27. Adjacent switch elements 20, 21, etc., are cross connected between adjacent resistances, 24, 25, etc., of the voltage divider. A trigger source 28, coupled by means of a condenser 29 is connected across the entire series connection of the elements 20–23. A choke coil 30 is preferably arranged in series with load 19 to isolate the trigger pulse from source 28 from the load and network 18. Resistances 24–27 are so dimensioned, and arranged to be of such value that their resistance is in proportion to the threshold potential of the associated solid state switching elements 20–23. The threshold potential of such solid state switching elements can be arranged very accurately. If the threshold potentials of elements 20–23 are similar, resistances 24–27 may likewise be similar. Minor variations can, however, be adjusted by suitable choice of the resistances.

If the potential of network 18 should become excessive for some reason or other, such excessive potential is equally applied across all the switching elements 20–23 by means of the voltage divider 24–27, and the intermediate cross-connections. Thus, overvoltage will not be applied to any one particular switching element, due to internal variations of the resistance of the switching elements when they are in their high resistance state. Short term, abrupt peaks can further be smoothed by choke 30, which thus has the dual function of preventing undesired switching due to overvoltage from network 18, as well as preventing damage to load 19 or the components in network 18, due to pulses from trigger source 28.

The value of the impedances 24 to 27 themselves may be less than the internal resistance of the switch elements 20–23, when in their high resistance state; it should, however, be so dimensioned that the current therethrough is sufficient to hold any one of the elements 20–23 in their switched ON, low resistance state.

The potential dividers 12, 13, 14 of FIG. 2 may of course, also be resistances; and likewise, a single trigger source as for example shown in FIG. 3 may be utilized with a potential divider formed of condensers. Likewise, a single trigger source may be coupled by means of a multi-winding transformer, and phase shifts arising within the transformer, for example due to poor construction of the core, will not cause difficulties. The invention has been illustrated in connection with a supply by alternating current, so that a new trigger pulse is necessary for each half-wave. This trigger pulse may arise at any time within the half-wave, and may be synchronized with respect to the phase of the supply in any desired, and well-known manner, to provide for control of the current through the load. If direct current supply is utilized, the solid state switching elements will remain in their low resistance state, and will not switch OFF until the supply is interrupted, by example, by an external switch.

The invention thus provides an electrical circuit utilizing a plurality of serially connected voltage sensitive switching elements, as described, and having connected in parallel therewith impedance means which supply a current to respective elements, which is least of the value of the holding current for any element. These impedance means are advantageously formed of a voltage divider, connected in parallel with the chain of serially connected elements, and having cross connections from tap off points of the voltage divider to the junctions of adjacent serially connected elements.

What I claim and desire to be secured by Letters Patent is:

1. In a switching circuit, for use in logic operations and the like, a plurality of serially connected voltage-responsive, bilateral switching elements responsive to voltage trigger pulses of trigger potential for assuming a conductive condition corresponding to an "on" condition and responsive to a holding current to maintain said "on" condition, said bilateral switching elements assuming a nonconductive condition corresponding to an off condition in said circuit in the absence of trigger pulses of said trigger potential and upon triggering thereof in the absence of said holding current, a load in said circuit, connections for connecting an alternating current source, connections to said load, source and switching elements for applying current from said source to said load through said switching elements when all of said switching elements are simultaneously in an "on" condition, means in parallel with said switching elements applying trigger pulses to said switching elements of the same polarity as a halfwave of voltage applied from said source during which said trigger pulses are applied and applying said trigger pulses without absolute synchronism within the same half-wave of voltage applied from said source, a voltage divider in said circuit in parallel with said switching elements connected across said alternating current source applying holding current to said switching elements individually to maintain said switching elements "on" once triggered for insuring all of said switching elements are in said "on" condition when said trigger pulses are applied in a common half-cycle of said alternating current.

2. A circuit according to claim 1, in which said switching elements each have a threshold potential, and said voltage divider comprising a plurality of serially connected capacitors each applying holding current to a respective switching element.

3. A switching circuit according to claim 1, in which said voltage divider comprises a plurality of impedances in series, said plurality comprising one impedance for each switching element to which it is connected in parallel, the value of any impedance with respect to the total series impedance being proportional to the ratio of trigger potential value of the switching element with which it is connected in parallel, with respect to the sum of the threshold potentials of all switching elements.

4. A switching circuit according to claim 1, in which said voltage divider comprises a plurality of serially connected impedances, the value of the impedances being arranged with respect to the potential of said voltage source, to be of such value that the current through the impedances is at least as great as the holding current for any of said switching elements.

5. In a switching circuit according to claim 1, in which said switching elements comprise bilateral, solid state switching elements each capable of switching from a high resistance to a low resistance condition on application of a voltage in excess of a threshold value and of reverting to the high resistance condition when the current passing through a switching element falls below a given holding value.

6. In a switching circuit according to claim 5, in which said switching elements consist of approximately 67.5% tellurium, 25% arsenic, and 7.5% germanium or silicon.

References Cited

UNITED STATES PATENTS

| | | | |
|---|---|---|---|
| 3,171,040 | 2/1965 | Goebel | 307—252 |
| 3,267,290 | 8/1966 | Diebold | 307—202 |
| 3,271,591 | 9/1966 | Ovshinsky | 307—268 |
| 3,274,397 | 9/1966 | Heckman et al. | 307—252 |

FOREIGN PATENTS 917,382 2/1963 Great Britain.

OTHER REFERENCES

Solid State Products, Inc., Bulletin D420-02, September 1960 (pp. 20, 21).

DONALD D. FORRER, Primary Examiner

S. T. KRAWCZEWICZ, Assistant Examiner

U.S. Cl. X.R.

307—206, 252, 258, 274, 324